(12) United States Patent
Li et al.

(10) Patent No.: US 9,014,009 B2
(45) Date of Patent: Apr. 21, 2015

(54) METHOD AND DEVICE FOR LOCATING A FAILED LINK, AND METHOD, DEVICE AND SYSTEM FOR ANALYZING ALARM ROOT CAUSE

(75) Inventors: Guoping Li, Beijing (CN); Wei Meng, Nanjing (CN); Ruihong Wang, Shenzhen (CN); Hongde Zhang, Nanjing (CN); Yi Luo, Nanjing (CN); Chenmin Wang, Nanjing (CN); Zhiming Ye, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 687 days.

(21) Appl. No.: 13/338,468

(22) Filed: Dec. 28, 2011

(65) Prior Publication Data

US 2012/0093005 A1 Apr. 19, 2012

Related U.S. Application Data

(63) Continuation of application No. PCT/CN2010/075774, filed on Aug. 6, 2010.

(30) Foreign Application Priority Data

Nov. 18, 2009 (CN) .......................... 2009 1 0223382

(51) Int. Cl.
*H04L 1/00* (2006.01)
*H04L 12/26* (2006.01)
(Continued)

(52) U.S. Cl.
CPC ........... *H04L 41/0677* (2013.01); *H04L 41/065* (2013.01); *H04L 41/06* (2013.01); *H04L 41/0631* (2013.01); *H04L 41/0645* (2013.01); *H04L 41/064* (2013.01)

(58) Field of Classification Search
CPC ... H04L 41/06; H04L 41/0631; H04L 41/064; H04L 41/0645; H04L 41/065
See application file for complete search history.

(56) References Cited

U.S. PATENT DOCUMENTS 7,729,269 B1 * 6/2010 Nucci et al. .................... 370/252
2002/0111755 A1 8/2002 Valadarsky et al.
(Continued)

FOREIGN PATENT DOCUMENTS

CN 1505284 A 6/2004
CN 1885789 A 12/2006
(Continued)

OTHER PUBLICATIONS

Extended European Search Report dated (mailed) Feb. 15, 2012, issued in related Application No. 10831067.3-2416, PCT/CN20100075774, Hauwei Technologies Co., Ltd.
(Continued)

*Primary Examiner* — Hassan Phillips
*Assistant Examiner* — Lonnie Sweet
(74) *Attorney, Agent, or Firm* — Slater & Matsil, L.L.P.

(57) ABSTRACT

An alarm root cause analyzing method includes: obtaining at least one alarm of a managed network; sending an alarm raising time to a failed link locating device; receiving an identifier of a failed link, an identifier of an affected edge device, and an identifier of a device interface of the affected edge device; querying whether any alarm from the failed link exists in the at least one alarm, if an alarm from the failed link exists, marking the alarm from the failed link as a root cause alarm; querying whether any alarm from the affected edge device exists in the at least one alarm, if an alarm from the affected edge device exists, if a service object corresponding to the alarm from the affected edge device is borne over the device interface of the affected edge device, marking the alarm from the affected edge device as a derivative alarm.

22 Claims, 5 Drawing Sheets

(51) Int. Cl.
*H04L 12/28* (2006.01)
*H04L 12/16* (2006.01)
*H04L 12/24* (2006.01)

(56) References Cited

U.S. PATENT DOCUMENTS

| | | |
|---|---|---|
| 2003/0065986 A1 | 4/2003 | Fraenkel et al. |
| 2004/0249803 A1* | 12/2004 | Vankatachary et al. ........... 707/3 |
| 2005/0259586 A1* | 11/2005 | Hafid et al. .................... 370/241 |
| 2007/0177523 A1* | 8/2007 | Nagami et al. ................. 370/252 |
| 2008/0124074 A1 | 5/2008 | Yang et al. |
| 2008/0133288 A1 | 6/2008 | Thibaux et al. |
| 2008/0240710 A1 | 10/2008 | Nishioka |
| 2009/0219804 A1* | 9/2009 | Cole et al. ..................... 370/218 |
| 2010/0074101 A1* | 3/2010 | Skalecki et al. .............. 370/221 |

FOREIGN PATENT DOCUMENTS

| | | |
|---|---|---|
| CN | 101355451 A | 1/2009 |
| CN | 101494572 A | 7/2009 |
| CN | 101707537 A | 5/2010 |
| WO | WO 2011/060651 A | 5/2011 |

OTHER PUBLICATIONS

Steinder et al., A survey of fault localization techniques in computer networks, Science of Computer Programming 53 (2004) 165-194 Jul. 2004.

Yu et al., A practical scheme for PMLS fault monitoring and alarm correlation in backbone networks, Computer Networks 50 (2006) 3024-3042 Dec. 2005.

Miyazawa et al., Real-time Root Cause Analysis in OSS for a Multi-layer and Multi-domain Network using a Hierarchical Circuit Model and Scanning Algorithm, 2009 IFIP/IEEE International Symposium on Integrated Network Management, IEEE 2009.

International Search Report for International Application No. PCT/CN2010/075774, mailed Nov. 18, 2010 Huawei Technologies Co., Ltd.

* cited by examiner

METHOD AND DEVICE FOR LOCATING A FAILED LINK, AND METHOD, DEVICE AND SYSTEM FOR ANALYZING ALARM ROOT CAUSE

CROSS-REFERENCE TO RELATED APPLICATIONS

This application is a continuation of International Application No. PCT/CN2010/075774, filed on Aug. 6, 2010, which claims priority to Chinese Patent Application No. 200910223382.3, filed on Nov. 18, 2009, both of which are hereby incorporated by reference in their entireties.

FIELD

The present disclosure relates to the field of computer network technologies, and in particular to a method for locating a failed link and a method, a device, and a system for analyzing alarm root cause.

BACKGROUND

In a computer network, alarm root cause analysis is usually divided to device level alarm root cause analysis and network level alarm root cause analysis. The device level alarm root cause analysis concerns about relations among alarms generated by an individual device while the network level alarm root cause analysis concerns about relations among alarms generated by multiple devices. Currently, the device level alarm root cause analysis already has mature implementations, but the network level alarm root cause analysis is limited because a network management system lacks network end-to-end path information.

An alarm root cause analysis solution in the prior art is based on a service object model; dependencies between objects may be obtained by analyzing the service object model. When one object fails, an alarm is generated and objects depending on the failed object also generate alarms as being affected. The former is a root cause alarm and the latter are derivative alarms. Therefore, when alarms are generated between objects, the relations between alarms can be obtained according to the dependencies between objects. Further, alarm correlation rules can be generalized according to these relations. When alarms are generated, the alarm root cause analysis may be performed according to the alarm correlation rules.

Figure 1:
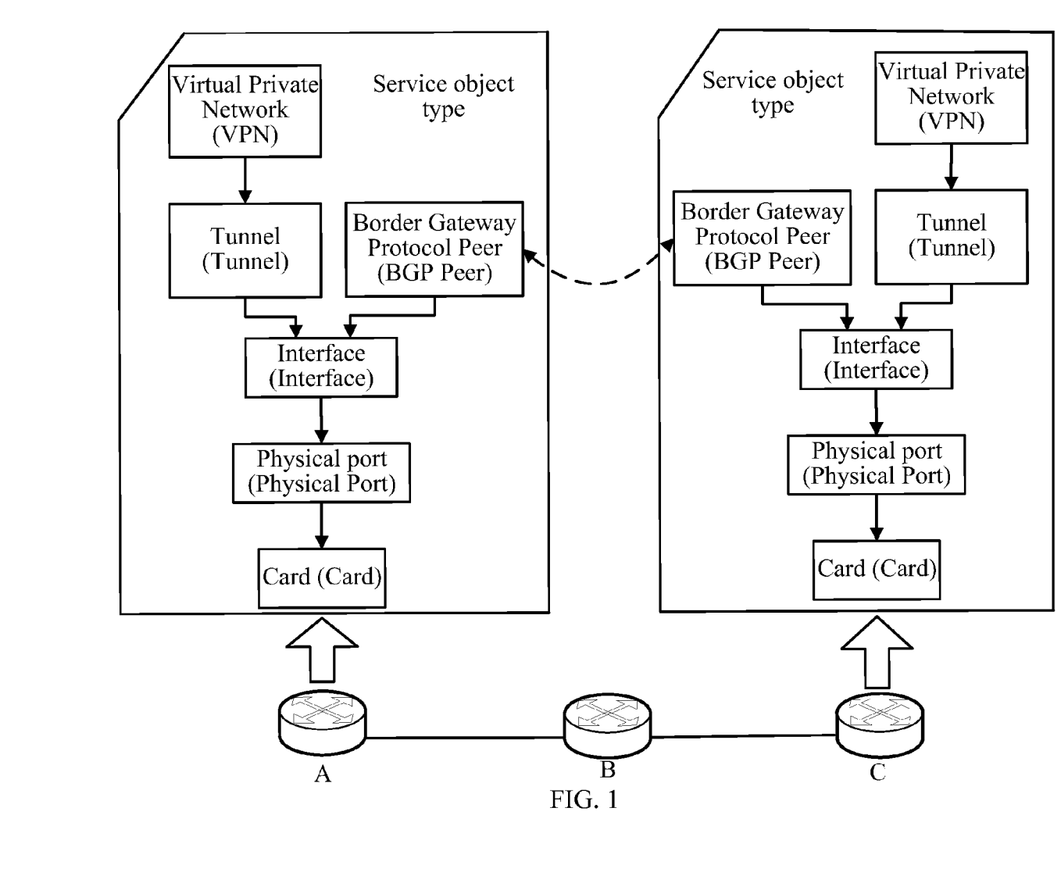
FIG. 1 is a schematic diagram of a network segment based on a service object model in a prior art.

FIG. 1 is a schematic diagram of a network segment based on a service object model in the prior art. As shown in FIG. 1, the network segment is formed by three devices, namely device A, device B, and device C, where device A, device B and device C are respectively used as a node (such as a router) in the network segment. A service object model, which includes objects such as a card (Card), a physical port (Physical Port), an interface (Interface), a tunnel (Tunnel), a virtual private network (Virtual Private Network, VPN), a border gateway protocol peer (Border Gateway Protocol Peer, BGP Peer), is built on device A and device C respectively. In the service object model, an upper layer object is dependent on its lower layer objects. In this way, when an object, such as a physical port (Physical Port), borne on device A fails, device A raises an alarm, and being affected, the Interface, Tunnel, VPN and BGP Peer borne on device A also generate alarms. Meanwhile, the BGP Peer on device C also generates an alarm. The root cause analysis between the alarms may be performed according to the relations between the objects in the service object model.

In another aspect, if device B fails, device B generates an alarm; meanwhile, as device B fails, a path between device A and device C also fails. In this case, objects borne on device A and device C also fail accordingly and generate alarms. Intuitively, the alarm generated by device B should be a root cause alarm and the alarms generated by the objects borne on device A and device C should be derivative alarms. However, a prerequisite of such network level alarm root cause analysis is that the network management system must know path information between device A and device C.

A feasible solution is that the network management system collects network routing information in real time and caches routing information in a latest period of time (usually a few minutes) for alarm root cause analysis when a device fails. But this solution requires the network management system should collect routing information in all devices in the network, which consumes many resources of the network management system and can hardly guarantee realtime collection. When a large volume of routing information exists, a lot of bandwidth resources and device resources are surely consumed, thereby affecting the network performance. Ultimately, a comprehensive implementation of the network level alarm root cause analysis cannot be realized.

SUMMARY

Embodiments of the present disclosure provide a method for locating a failed link, and a method, a device, and a system for alarm root cause analysis, so as to realize network level alarm root cause analysis.

To solve the foregoing technical problems, the embodiments of the present disclosure provide the following technical solutions.

An embodiment of the present disclosure provides a failed link locating method, including:

obtaining an alarm raising time;

comparing a pre-failure link state database and a post-failure link state database that are corresponding to the alarm raising time to determine a failed link;

determining, in an entire-network path vector matrix, an affected edge device corresponding to the failed link and a device interface of the affected edge device; and sending an identifier of the failed link, an identifier of the affected edge device, and an identifier of the device interface of the affected edge device to a device for alarm root cause analysis.

An embodiment of the present disclosure provides an alarm root cause analyzing method, including:

obtaining at least one alarm of a managed network;

sending an alarm generating time to a device for locating a failed link;

receiving an identifier of a failed link, an identifier of an affected edge device, and an identifier of a device interface of the affected edge device that are sent by the device for locating a failed link;

where the identifier of the failed link, the identifier of the affected edge device, and the identifier of the device interface of the affected edge device are located, according to the alarm raising time, by the device for locating a failed link;

querying whether any alarm from the failed link exists in the at least one alarm, and if an alarm from the failed link exists, marking the alarm from the failed link as a root cause alarm; and querying whether any alarm from the affected edge device exists in the at least one alarm, and if an alarm from the affected edge device exists, judging whether a service object corresponding to the alarm from the affected edge device is borne over the device interface of the affected edge device, and if yes, marking the alarm from the affected edge device as a derivative alarm.

An embodiment of the present disclosure provides a failed link locating device, including:

a receiving module, configured to receive an alarm raising time sent by a device for alarm root cause analysis;

a comparing module, configured to compare a pre-failure link state database and a post-failure link state database that are corresponding to the alarm raising time to determine a failed link;

a determining module, configured to determine, in an entire-network path vector matrix, an affected edge device corresponding to the failed link and a device interface of the affected edge device; and a sending module, configured to send an identifier of the failed link, an identifier of the affected edge device, and an identifier of the device interface of the affected edge device to the device for alarm root cause analysis.

An embodiment of the present disclosure further provides an alarm root cause analyzing device, including:

a second receiving module, configured to obtain at least one alarm of a managed network;

a second sending module, configured to send an alarm raising time to a device for locating a failed link;

a third receiving module, configured to receive an identifier of a failed link, an identifier of an affected edge device, and an identifier of a device interface of the affected edge device that are sent by the device for locating a failed link; where the identifier of the failed link, the identifier of the affected edge device, and the identifier of the device interface of the affected edge device are located, according to the alarm raising time, by the device for locating a failed link;

a querying module, configured to query whether any alarm from the failed link exists in the at least one alarm; and whether any alarm from the affected edge device exists in the at least one alarm;

a marking module, configured to, when the querying module queries that an alarm from the failed link exists in the at least one alarm, mark the alarm from the failed link as a root cause alarm; and a judging module, configured to, when the querying module queries that an alarm from the affected edge device exists in the at least one alarm, judge whether a service object corresponding to the alarm from the affected edge device is borne over the device interface of the affected edge device;

where the marking module is further configured to, when the querying module queries that an alarm from the affected edge device exists in the at least one alarm and a judging result of the judging module is yes, mark the alarm from the affected PE as a derivative alarm.

An embodiment of the present disclosure further provides an alarm root cause analyzing system, including:

a failed link locating device and an alarm root cause analyzing device, where:

the failed link locating device is configured to receive an alarm raising time sent by the alarm root cause analyzing device; compare a pre-failure link state database and a post-failure link state database that are corresponding to the alarm raising time to determine a failed link; determine, in an entire-network path vector matrix, an affected edge device corresponding to the failed link and a device interface of the affected edge device; and send an identifier of the failed link, an identifier of the affected edge device, and an identifier of the device interface of the affected edge device to the alarm root cause analyzing device; and the alarm root cause analyzing device is configured to obtain at least one alarm of a managed network; send the alarm raising time to the failed link locating device; receive the identifier of the failed link, the identifier of the affected edge device, and the identifier of the device interface of the affected edge device that are sent by the failed link locating device, where the identifier of the failed link, the identifier of the affected edge device, and the identifier of the device interface of the affected edge device are located, according to the alarm raising time, by the failed link locating device; query whether any alarm from the failed link exists in the at least one alarm, and if an alarm from the failed link exists, mark the alarm from the failed link as a root cause alarm; and query whether any alarm from the affected edge device exists in the at least one alarm, and if an alarm from the affected edge device exists, further judge whether a service object corresponding to the alarm from the affected edge device is borne over the device interface of the affected edge device, and if yes, mark the alarm from the affected PE as a derivative alarm.

It can be known from the foregoing technical solution that the embodiments of the present disclosure have the following benefit:

In the embodiments of the present disclosure, a failed link may be determined by comparing the pre-failure link state database and the post-failure link state database, and then an affected edge device and a device interface of the affected edge device may be determined in an entire-network path vector matrix; when it is queried that any alarm from the failed link and exists in the at least one alarm, the alarm is marked as a root cause alarm; when it is queried that any alarm from the affected edge device exists in the at least one alarm, and a service object corresponding to the alarm is borne over the device interface of the affected edge device, the alarm is marked as a derivative alarm. The embodiments of the present disclosure may realize network level alarm root cause analysis without collecting routing information in all devices in the network, and therefore the consumption of network resources is reduced.

BRIEF DESCRIPTION OF THE DRAWINGS

To better describe the technical solution of the embodiments of the present disclosure or the prior art, accompanying drawings involved in the description of the embodiments are outlined below. It is apparent that the accompanying drawings illustrate only some exemplary embodiments of the present disclosure. Those of ordinary skill in the art may derive other drawings from these accompanying drawings without creative efforts.

DETAILED DESCRIPTION OF THE EMBODIMENTS

The technical solution of the embodiments of the present disclosure is clearly and completely described with reference to the accompanying drawings. It is apparent that the described embodiments are only part of rather than all of the embodiments of the present disclosure. Based on the embodiments of the present disclosure, those of ordinary skill in the art can derive other embodiments without creative efforts and such other embodiments shall all fall within the protection scope of the present disclosure.

Figure 2:
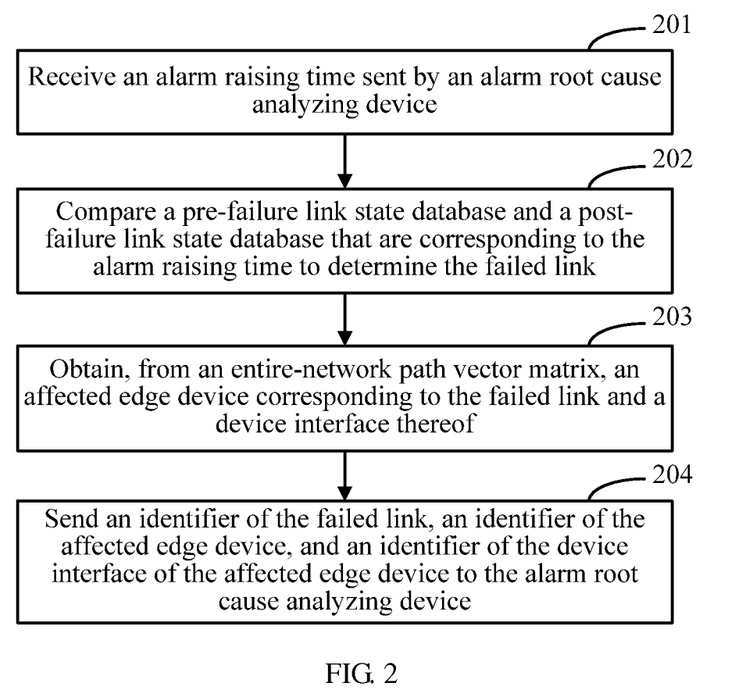
FIG. 2 is a flowchart of a failed link locating method according to an embodiment of the present disclosure.

FIG. 2 is a flowchart of a failed link locating method according to an embodiment of the present disclosure. As shown in FIG. 2, the method may include:

201: Receive an alarm raising time sent by an alarm root cause analyzing device.

In an embodiment, the alarm raising time sent by the alarm root cause analyzing device may be carried in a request message or another message or signaling. For example, a failed link locating device may receive a request message that carries the alarm raising time and is sent by the alarm root cause analyzing device, and receiving the alarm raising time sent by the alarm root cause analyzing device. Definitely, the alarm raising time may also be obtained in other approaches.

The alarm raising time refers to the time when a device in relation with a failed link generates an alarm when the link of a managed network fails. For example, when a link in a managed network fails, devices at two ends of the failed link may generate alarms, and moreover, other devices (including edge devices) in the path that includes the failed link may also generate alarms because of as being affected.

Caused by the same failed link, multiple devices generate alarms almost simultaneously (an interval is usually a few microseconds). Therefore, when one link in the managed network fails, the time when devices in relation with the failed link generate alarms may be regarded as one alarm time.

In addition, the alarm root cause analyzing device may receive, by using a simple network management protocol (Simple Network Management Protocol, SNMP), one or more alarms reported by the managed network. Alternatively, the alarm root cause analyzing device may scan the managed network actively to find alarms of the managed network; and then carry the alarm raising time in a request message and send the request message to the failed link locating device.

202: Compare a pre-failure link state database and a post-failure link state database that are corresponding to the alarm raising time to determine the failed link.

In an embodiment, before performing step 201, the failed link locating device may listen to a link state database (Link State Database, LSDB) update message sent by a network control plane through an IS-IS (Intermediate System to Intermediate System, intermediate system to intermediate system) routing protocol or a shortest routing selection (Open Shortest Path First, OSPF) protocol.

In this scenario, the failed link locating device may store the pre-failure LSDB and further store the post-failure LSDB, where a start time when the failed link locating device further stores the post-link LSDB corresponds to the alarm raising time in step 201.

Where, the start time when the failed link locating device further stores the post-failure LSDB corresponding to the alarm raising time in step 201 is that: the start time when the failed link locating device further stores the post-failure LSDB is the same as the alarm raising time in step 201; in this case, when the managed network generates an alarm, the failed link locating device stores the post-failure LSDB.

Alternatively, the start time when the failed link locating device further stores the post-failure LSDB is obtained by delaying the alarm raising time in step 201 for a certain period (a duration of delay depends on the network performance); in this case, when the managed network generates an alarm, the failed link locating device stores the post-failure LSDB after a certain period of delay.

For example, the failed link locating device may compare a state of each link in the stored pre-failure link state database that corresponds to the alarm raising time of the failed link locating device with a state of each link in the post-failure link state database that corresponds to the alarm raising time of the failed link locating device, and the link in invalid state is a failed link. When a link in the managed network fails, the state of the failed link is invalid. For example, when link L fails, the state of link L in the post-failure link state database is invalid and the state of link L in the pre-failure link state database is valid. It can be known that link L fails by comparing the state of link L in the pre-failure link state database with the state of link L in the post-failure link state database.

203: Obtain, from an entire-network path vector matrix, an affected edge device corresponding to the failed link and a device interface thereof.

In an embodiment, the failed link locating device may pre-calculate the entire-network path vector matrix by using a shortest path first algorithm.

For example, the failed link locating device may determine, from the pre-calculated entire-network path vector matrix PV (N, N), a path including a failed link, where an edge device on the path is the affected edge device, and an interface, which is connected with the path, of the affected edge device is the device interface of the affected edge device.

Suppose that N edge devices (Provider Edge, PE) exist in the managed network. Then, the failed link locating device may obtain the entire-network path vector matrix PV (N, N) shown in Table 1 after N times of calculations by using the shortest path first algorithm.

TABLE 1

|     | $PE_1$ | $PE_2$ | ... | $PE_N$ |
|-----|--------|--------|-----|--------|
| $PE_1$ | $PV_{11}$ | $PV_{12}$ | ... | $PV_{1N}$ |
| $PE_2$ | $PV_{21}$ | $PV_{22}$ | ... | $PV_{2N}$ |
| ... | ... | ... | ... | ... |
| $PE_N$ | $PV_{N1}$ | $PV_{N2}$ | ... | $PV_{NN}$ |

In Table 1, $PV_{ij}$ represents a path from an edge device $PE_i$ to an edge device $PE_j$. Based on the entire-network path vector matrix PV (N, N), all affected edge devices ($PE_i \to PE_j$) may be calculated when a certain link fails (for example being interrupted). The affected edge device in the embodiment of the present disclosure is a service affected edge device.

For example, it is assumed that some path vectors are as follows:

PV12=PE1→A→B→C→PE2

PV13=PE1→A→B→D→PE3

PV14=PE1→E→B→C→PE4

When link B→C fails, affected edge devices PE are (PE1, PE2), and (PE1, PE4), where interfaces connecting PV12 with PE1 and PE2 are the device interface of PE1 and the device interface of PE2, and interfaces connecting PV14 with PE1 and PE4 are the device interface of PE1 and the device interface of PE4.

204: Send an identifier of the failed link, an identifier of the affected edge device, and an identifier of the device interface of the affected edge device to the alarm root cause analyzing device.

The identifier of the affected edge device may be an internet protocol (Internet Protocol, IP) address of the affected edge device, or a name of the affected edge device. The identifier of the device interface of the affected edge device may be a name of the device interface of the affected edge device or a serial number of the device interface of the affected edge device.

The path where the device interface of the affected edge device is located includes the foregoing failed link.

For example, the identifier of the failed link in step 204 may include addresses of devices at two ends of the failed link and the device interfaces at two ends of the failed link. For example, the identifier of the failed link may be: address of device i, address of interface a → device j, interface b, where the addresses of device i and device j may be internet protocol (Internet Protocol, IP) addresses.

In the failed link locating method provided in the embodiment of the present disclosure, the failed link may be determined by comparing the pre-failure link state database and the post-failure link state database, thereby the affected edge device and the device interface thereof may be determined from the entire-network path vector matrix. In the embodiment of the present disclosure, the failed link may be easily obtained without collecting routing information in all devices in the network, and therefore the consumption of network resources is reduced.

Figure 3:
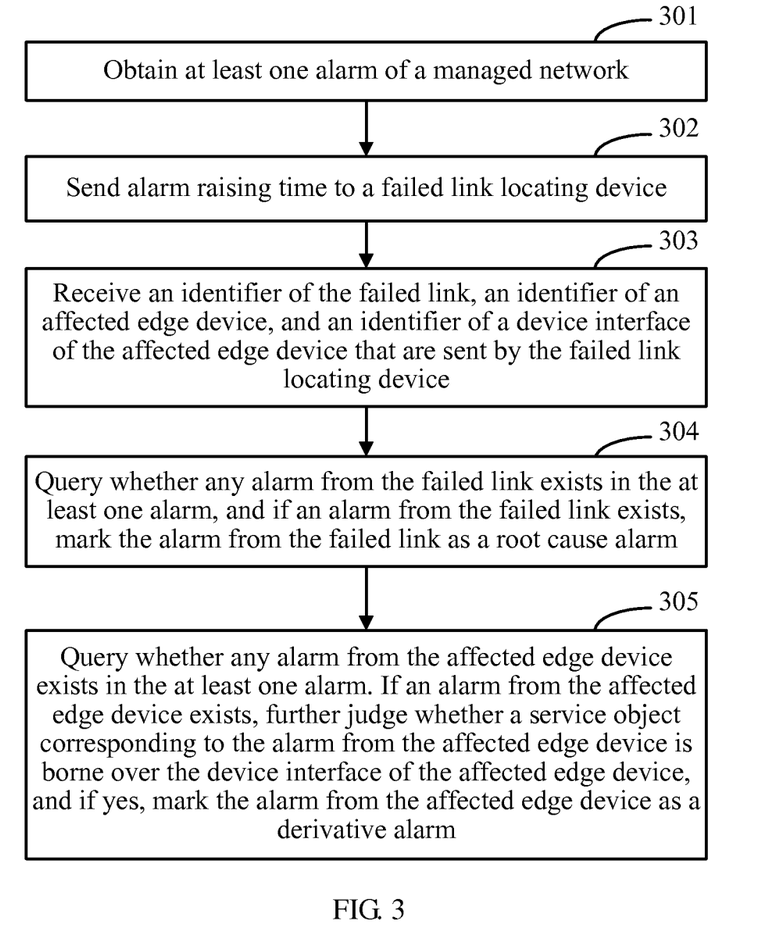
FIG. 3 is a flowchart of an alarm root cause analyzing method according to an embodiment of the present disclosure.

FIG. 3 is a flowchart of an alarm root cause analyzing method according to an embodiment of the present disclosure. As shown in FIG. 3, the method may include:

301: Obtain at least one alarm of a managed network.

In an embodiment, an alarm root cause analyzing device may receive at least one alarm reported by the managed network; or the alarm root cause analyzing device scans the managed network actively to find an alarm of the managed network.

The alarm root cause analyzing device may receive, by using an SNMP protocol or a program NETCONF (Network Configuration), one or more alarms reported by the managed network.

302: Send alarm raising time to a failed link locating device.

After receiving the at least one alarm reported by the managed network, the alarm root cause analyzing device may carry the alarm raising time in a request message and send the request message to the failed link locating device.

The alarm raising time in step 302 is described in detail in the previous embodiment and will not be described herein again.

303: Receive an identifier of the failed link, an identifier of an affected edge device, and an identifier of a device interface of the affected edge device, that are sent by the failed link locating device.

The identifier of the failed link, the identifier of the affected edge device and the identifier of the device interface of the affected edge device in step 303 are located, according to the foregoing alarm raising time, by the failed link locating device.

The specific implementation method for the failed link locating device to locate the failed link, the affected edge device and the device interface of the affected edge device is also described in detail in the previous embodiment, and will not be described herein again.

304: Query whether any alarm from the failed link exists in the at least one alarm, and if an alarm from the failed link exists, mark the alarm from the failed link as a root cause alarm.

As described in the previous embodiment, the identifier of the failed link may include the addresses of devices at two ends of the failed link and the device interfaces at two ends of the failed link. In this way, the alarm root cause analyzing device may query whether the device address carried in each alarm of the at least one alarm is the same as the device address at either end of the failed link. If the device address carried in each alarm of the at least one alarm is the same as the device address at either end of the failed link, the alarm root cause analyzing device further queries whether a service object corresponding to the alarm is borne over the failed link; and if yes, the alarm is an alarm from the failed link; otherwise, the alarm is an alarm from another link or another device.

The service object includes at least one or more of the following: device, card, port, and channel. Taking the card as an example, if a card failure alarm is queried, a port corresponding to the failed link is a port on the failed card, and a card alarm raising time matches a link failure time, it may be determined that the link failure is caused by the card failure, that is, the card failure alarm is the root cause alarm.

The service objects corresponding to different alarms may vary. For example, the service object corresponding to a port failure is a port, and the service object corresponding to a card failure is a card.

It may be queried whether the device interface that bears the service object corresponding to the alarm is the same as the device interface at either end of the failed link. If the device interface that carries the service object corresponding to the alarm is the same as the device interface at either end of the failed link, it indicates that the alarm is an alarm from the failed link; otherwise, it indicates that the alarm is an alarm from another link or another device.

The device interface that bears the service object corresponding to each alarm is preconfigured in the system.

For example, the devices at the two ends of link L are: device i, with the address 192.168.1.20 and interface A; and device j, with the address 192.168.1.31 and interface B. Because device i and device j are the two end devices of link L, when link L fails, device i and device j may raise alarms at the same time, or only device i raise s an alarm, or only device j raise s an alarm.

The alarm raised by device i carries the address of device i, 192.168.1.20. The alarm raised by device j carries the address of device j, 192.168.1.31. Thus, if the alarm root cause analyzing device queries in the at least one alarm an alarm carrying the address 192.168.1.20, or an alarm carrying the address 192.168.1.31, or both an alarm carrying the address 192.168.1.20 and an alarm carrying the address 192.168.1.31, the alarm root cause analyzing device further queries that the device interface bearing the service object corresponding to the alarm is interface A and interface B (namely, being borne over the failed link), which indicates that the alarm is from link L where the failure occurs.

305: Query whether any alarm from the affected edge device exists in the at least one alarm. If an alarm from the affected edge device exists, further judge whether a service object corresponding to the alarm from the affected edge device is borne over the device interface of the affected edge device, and if yes, mark the alarm from the affected edge device as a derivative alarm.

For example, the alarm root cause analyzing device may also use the foregoing method to query whether the device address carried in each of the at least one alarm is the same as the device address of the affected edge device; and if the device address carried in each alarm of the at least one alarm is the same as the device address of the affected edge device, the alarm is an alarm from the affected edge device; otherwise, the alarm is an alarm from another link or another device.

As multiple interfaces for bearing services may exist on the affected edge device, even if it is queried in step 305 that an alarm from the affected edge device exists in the at least one alarm, it still can not be determined that the alarm is caused by the failed link. It may be further judged that the service object corresponding to the alarm from the affected edge device is borne over the device interface of the affected edge device (that is, borne over the path where the device interface of the affected edge device is located), so as to determine that the alarm is caused by the failed link. As a path includes some links, if a link included in the path where the device interface of the affected edge device is located fails, the affected edge device raises an alarm, where the alarm is indirectly caused by the failed link and may be marked as a derivative alarm, while the alarm(s) raised by the devices at two ends of the failed link is (are) a root cause alarm.

In an embodiment, the alarm root cause analyzing method may further create a corresponding relation among the identifier of the failed link, the root alarm and the derivative alarm. In this way, when alarms occur in the managed network, relevance analysis may be performed on the alarms according to the corresponding relation.

In the alarm root cause analyzing method provided in the embodiment of the present disclosure, after receiving the failed link, affected edge device, and device interface of the affected edge device that are sent by the failed link locating device, if it is queried that an alarm from the failed link exists in the at least one alarm, the alarm is marked as a root cause alarm; if it is queried that an alarm from the affected edge device exists in the at least one alarm and that the service object corresponding to the alarm is borne over the device interface of the affected edge device, the alarm is marked as a derivative alarm. The embodiment of the present disclosure may realize network level alarm root cause analysis without collecting routing information in all devices in the network, and therefore the consumption of network resources is reduced.

Figure 4:
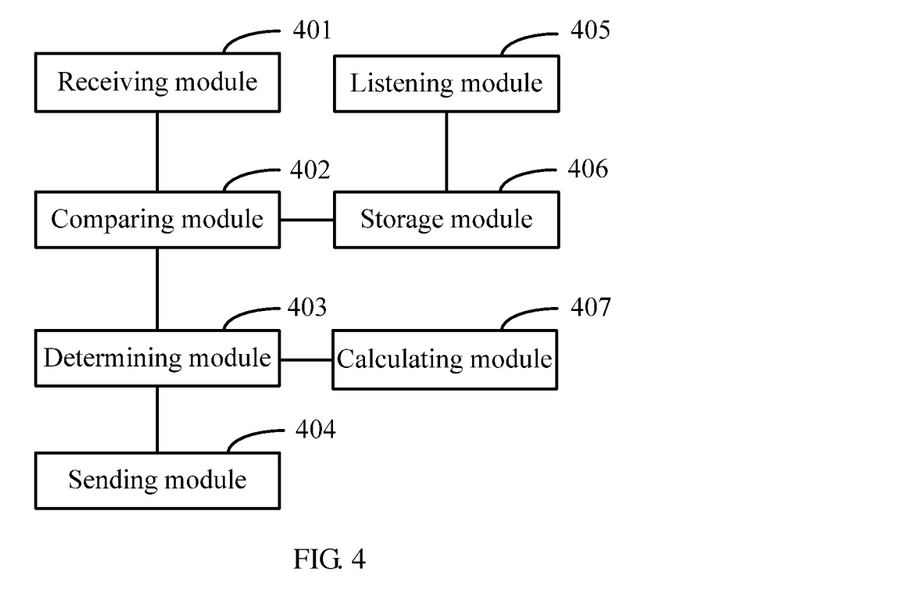
FIG. 4 is a structural diagram of a failed link locating device according to an embodiment of the present disclosure.

FIG. 4 is a structural diagram of a failed link locating device according to an embodiment of the present disclosure. As shown in FIG. 4, the failed link locating device may include:

a receiving module 401, configured to receive an alarm raising time sent by a alarm root cause analyzing device;

the description of receiving the alarm raising time by the receiving module 401 is the same as related description in the previous embodiments and will not be described herein again.

a comparing module 402, configured to compare a pre-failure link state database and a post-failure link state database that are corresponding to the alarm raising time to determine the failed link;

a determining module 403, configured to determine, in an entire-network path vector matrix, an affected edge device corresponding to the failed link and a device interface of the affected edge device;

a sending module 404, configured to send an identifier of the failed link, an identifier of the affected edge device, and an identifier of the device interface of the affected edge device to the alarm root cause analyzing device.

As shown in FIG. 4, the failed link locating device may further include:

a listening module 405, configured to listen to a link state database update message sent by a network control plane, where the link state database update message is triggered by a link failure.

a storage module 406, configured to store the pre-failure link state database and the post-failure link state database, where a start time when the storage module 406 stores the post-failure link state database corresponds to the alarm raising time.

At this time, the comparing module 402 may be specifically configured to compare the pre-failure link state database and the post-failure link state database that are stored by the storage module 406 and corresponding to the alarm raising time and determine the failed link.

As shown in FIG. 4, the failed link locating device may further include:

a calculating module 407, configured to pre-calculate an entire-network path vector matrix by using a shortest path first algorithm.

At this time, the determining module 403 may be configured to determine, in the entire-network path vector matrix pre-calculated by the calculating module 407, the affected edge device corresponding to the failed link and the device interface of the affected edge device.

Preferably, the comparing module 402 may specially compare a state of each link in the pre-failure link state database corresponding to the alarm raising time, with a state of each link in the post-failure link state database corresponding to the alarm raising time, and the link in invalid state is the failed link.

Preferably, the determining module 403 may specially determine, in the pre-calculated entire-network path vector matrix, the path including the failed link, where an edge device on the path is the affected edge device and an interface, which is connected with the path, of the affected edge device is the device interface of the affected edge device.

For example, the identifier of the failed link may include addresses of devices at two ends of the failed link and the device interfaces of the devices.

In the failed link locating device provided in the embodiment of the present disclosure, the failed link may be obtained by comparing the pre-failure link state database and the post-failure link state database, thereby further the affected edge device and device interface of the affected edge device may be obtained from the entire-network path vector matrix. The embodiment of the present disclosure may easily determine the failed link without collecting routing information in all devices in the network, and therefore the consumption of network resources is reduced.

Figure 5:
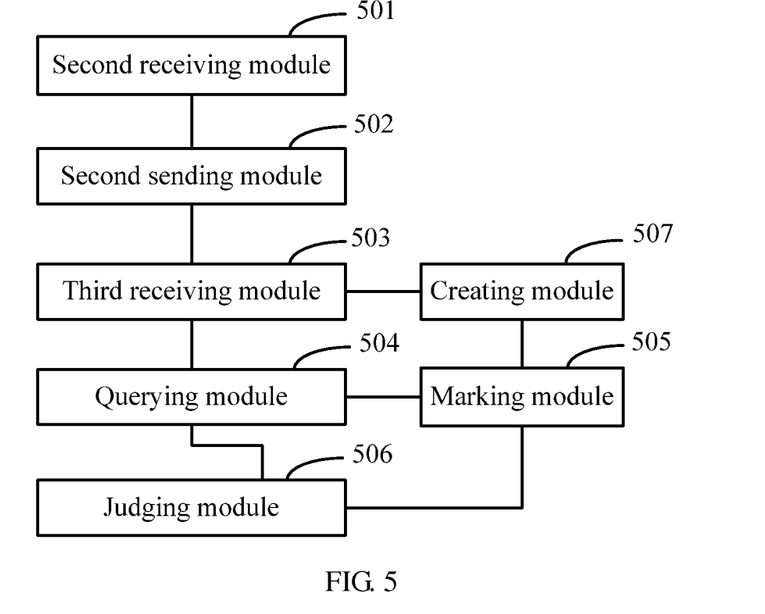
FIG. 5 is a structural diagram of an alarm root cause analyzing device according to an embodiment of the present disclosure.

FIG. 5 is a structural diagram of a alarm root cause analyzing device according to an embodiment of the present disclosure. As shown in FIG. 5, the alarm root cause analyzing device may include:

a second receiving module 501, configured to obtain at least one alarm of a managed network;

a second sending module 502, configured to send an alarm raising time to a failed link locating device;

in an embodiment, the second sending module 502 may carry the alarm raising time in a request message or another message or signaling, and send to the failed link locating device.

a third receiving module 503, configured to receive an identifier of the failed link, an identifier of the affected edge device, and an identifier of the device interface of the affected edge device that are sent by the failed link locating device;

the identifier of the failed link, the identifier of affected edge device and the identifier of the device interface of the affected edge device are located, according to the alarm generation time, by the failed link locating device.

a querying module 504, configured to query whether any alarm from the failed link exists in the at least one alarm received by the third receiving module 503, and whether any alarm from the affected edge device exists in the at least one alarm received by the third receiving module 503;

a marking module 505, configured to, when the querying module 504 queries that an alarm from the failed link exists in the at least one alarm received by the third receiving module 503, mark the alarm from the failed link as a root cause alarm;

a judging module 506, configured to, when the querying module 504 queries that an alarm from the affected edge device exists in the at least one alarm received by the third receiving module 503, further whether a service object corresponding to the alarm from the affected edge device is borne over the device interface of the affected edge device (that is, whether being borne over the path where the device interface of the affected edge device is located).

In this case, the marking module 505 is further configured to, when it is queried that an alarm from an affected edge device exists in the at least one alarm received by the third receiving module 503 and a judging result of the judging module 506 is yes, mark the alarm from the affected edge device as a derivative alarm.

Preferably, the identifier of the failed link may include addresses of devices at two ends of the failed link and the device interfaces of the devices.

For example, the querying module 504 may specifically query whether the device address carried by each alarm of the at least one alarm received by the third receiving module 503 is the same as the device address at either end of the failed link. If the device address carried by each alarm of the at least one alarm received by the third receiving module 503 is the same as the device address at either end of the failed link, the querying module 504 further queries whether the service object corresponding to the alarm is borne over the failed link; and if yes, the alarm is an alarm from the failed link; otherwise, the alarm is an alarm from another link or another device.

For example, the querying module 504 may query whether the device address carried by each alarm of the at least one alarm received by the third receiving module 503 is the same as the device address of the affected edge device, and if the device address carried by each alarm of the at least one alarm received by the third receiving module 503 is the same as the device address of the affected edge device, the alarm is an alarm from the affected edge device; otherwise, the alarm is an alarm from another link or another device.

As shown in FIG. 5, the device for alarm root cause analysis provided in the embodiment of the present disclosure may further include:

a creating module 507, configured to create a corresponding relation among the identifier of the failed link received by the third receiving module 503, and the root alarm and the derivative alarm that are marked by the marking module 505. In this manner, when alarms raised in the managed network, relevance analysis may be performed on the alarms according to the corresponding relation.

In the alarm root cause analyzing device provided in the embodiment of the present disclosure, after receiving the failed link, affected edge device, and device interface of the affected edge device that are sent by the failed link locating device, if it is queried that an alarm from the failed link exists in the at least one alarm, the alarm is marked as a root cause alarm; if it is queried that an alarm from the affected edge device exists in the at least one alarm and the path where the device interface of the affected edge device is located includes the failed link, the alarm is marked as a derivative alarm. The embodiment of the present disclosure may realize network level alarm root cause analysis without collecting routing information in all devices in the network, and therefore the consumption of network resources is reduced.

Figure 6:
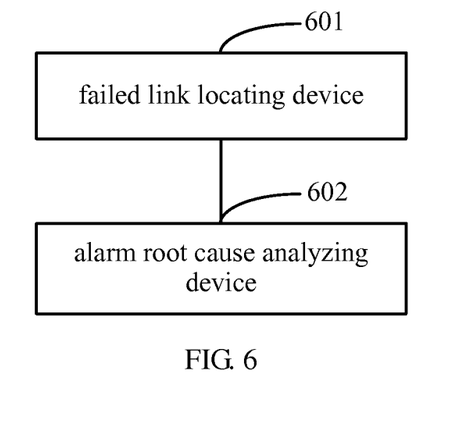
FIG. 6 is a structural diagram of an alarm root cause analyzing system according to an embodiment of the present disclosure.

FIG. 6 is a structural diagram of an alarm root cause analyzing system according to an embodiment of the present disclosure. As shown in FIG. 6, the alarm root cause analyzing system may include:

a failed link locating device 601 and a alarm root cause analyzing device 602.

The failed link locating device 601 is configured to receive an alarm raising time sent by the alarm root cause analyzing device 602; compare a pre-failure link state database that are corresponding to the alarm raising time with a post-failure link state database that are corresponding to the alarm raising time to determine a failed link; determine, in a pre-calculated entire-network path vector matrix, an affected edge device corresponding to the failed link and a device interface of the affected edge device; and send an identifier of the failed link, an identifier of the affected edge device, and an identifier of the device interface of the affected edge device to the alarm root cause analyzing device 602.

The alarm root cause analyzing device 602 is configured to: obtain at least one alarm of a managed network; send the alarm raising time to the failed link locating device 601; receive the identifier of the failed link, the identifier of the affected edge device, and the identifier of the device interfaces of the affected edge device that are sent by the failed link locating device 601, where the identifier of the failed link, the identifier of the affected edge device, and the identifier of the device interface of the affected edge device are located, according to the alarm raising time, by the failed link locating device 601; query whether any alarm from the failed link exists in the at least one alarm, and if an alarm from the failed link exists in the at least one alarm, mark the alarm from the failed link as a root cause alarm; and query whether any alarm from the affected edge device exists in the at least one alarm, and if an alarm from the affected edge device exists, further judge whether a service object corresponding to the alarm from the affected edge device is borne over the device interface of the affected edge device, and if yes, mark the alarm from the affected edge device as a derivative alarm.

Preferably, the alarm root cause analyzing device 602 may further be configured to create a corresponding relation among the identifier of the failed link, the root alarm and the derivative alarm. In this way, when alarms occur in the managed network, relevance analysis may be performed on the alarms according to the relation.

In the alarm root cause analyzing system provided in the embodiment of the present disclosure, the failed link locating device may obtain the failed link by comparing the pre-failure link state database with the post-failure link state database, and further obtain, from the entire-network path vector matrix, the affected edge device and device interface of the affected edge device; when querying that an alarm from the failed link exists in the at least one alarm, mark the alarm as a root cause alarm, and when querying that an alarm from the affected edge device exists in the at least one alarm and that the service object corresponding to the alarm is borne over the device interface of the affected edge device, mark the alarm as a derivative alarm. The embodiment of the present disclosure may realize network level alarm root cause analysis without collecting routing information in all devices in the network, and therefore the consumption of network resources is reduced.

An ordinary person skilled in the art understands that all or part of the steps in the methods of the foregoing embodiments of the present disclosure may be implemented through a program instructing relevant hardware. The program may be stored in a computer readable storage medium and when the program is executed, the steps in the methods of the foregoing embodiments of the present disclosure are executed. The storage medium may be any medium that may store program codes, such as a read-only memory (Read-Only Memory, ROM), a random access memory (Random-Access Memory, RAM), a magnetic disk, or a compact disk-read only memory.

Described above are the failed link locating method and the method, device and system for alarm root cause analysis provided in the embodiments of the present disclosure. Although the principles of the present disclosure are described with reference to exemplary embodiments, the present disclosure is not limited to such embodiments. It is apparent that those of ordinary skill in the art can make various modifications and variations to the present disclosure without departing from the spirit and scope of the present disclosure. The present disclosure is intended to cover the modifications and variations provided that they fall within the protection scope defined by the claims or their equivalents.

What is claimed is:

1. A failed link locating method, comprising:
   obtaining an alarm raising time;
   comparing a pre-failure link state database and a post-failure link state database that are corresponding to the alarm raising time to determine a failed link;
   determining, in an entire-network path vector matrix, an affected edge device corresponding to the failed link and a device interface of the affected edge device; and
   sending an identifier of the failed link, an identifier of the affected edge device, and an identifier of the device interface of the affected edge device to an alarm root cause analyzing device;
   wherein the comparing the pre-failure link state database and the post-failure link state database comprises comparing a state of each link in the pre-failure link state database corresponding to the stored alarm raising time and the state of each link in the post-failure link state database corresponding to the stored alarm raising time, and determining a link in invalid state as the failed link.

2. The method according to claim 1, wherein before the obtaining the alarm raising time, the method further comprises:
   listening to a link state database update message sent by a network control plane; and
   storing the pre-failure link state database and the post-failure link state database,
   wherein a start time of storing the post-failure link state database corresponds to the alarm raising time.

3. The method according to claim 1, wherein before the determining, in the entire-network path vector matrix, the affected edge device corresponding to the failed link and the device interface of the affected edge device, the method further comprises:
   calculating the entire-network path vector matrix by using a shortest path first algorithm.

4. The method according to claim 1, wherein the step of determining, in an entire-network path vector matrix, affected edge device corresponding to the failed link and the device interface of the affected edge device comprises:
   determining, in the entire-network path vector matrix, a path comprising the failed link,
   wherein the edge device in the path is the affected edge device, and an interface which is in connection with the path, of the affected edge device, is the device interface.

5. The method according to claim 1, wherein the identifier of the failed link comprises a plurality of addresses of devices at two ends of the failed link and a plurality of device interfaces of the devices at two ends of the failed link.

6. An alarm root cause analyzing method, comprising:
   obtaining at least one alarm of a managed network;
   sending an alarm raising time to a failed link locating device;
   receiving an identifier of a failed link, an identifier of an affected edge device, and an identifier of a device interface of the affected edge device that are sent by the failed link locating device;
   wherein the identifier of the failed link, the identifier of the affected edge device and the identifier of the device interface of the affected edge device are located, according to the alarm raising time, by the failed link locating device;
   querying whether any alarm from the failed link exists in the at least one alarm, and if an alarm from the failed link exists in the at least one alarm, marking the alarm from the failed link as a root cause alarm; and
   querying whether any alarm from the affected edge device exists in the at least one alarm, and if an alarm from the affected edge device exists, further judging whether a service object corresponding to the alarm from the affected edge device is borne over the device interface of the affected edge device, and if yes, marking the alarm from the affected edge device as a derivative alarm.

7. The method according to claim 6, wherein the identifier of the failed link comprises a plurality of addresses of devices at two ends of the failed link and a plurality of device interfaces of the devices at the two ends of the failed link.

8. The method according to claim 7, wherein the step of querying whether any alarm from the failed link exists in the at least one alarm comprises:
   querying whether a device address carried by each alarm of the at least one alarm is the same as the address of a device at either end of the failed link; and
   if the device address carried by each alarm of the at least one alarm is the same as the address of a device at either end of the failed link, querying whether a service object corresponding to the alarm is borne over the failed link, and if yes, determining that the alarm is an alarm from the failed link.

9. The method according to claim 6, wherein the step of querying whether any alarm from the affected edge device exists in the at least one alarm comprises:
   querying whether a device address carried by each alarm of the at least one alarm is the same as the address of the affected edge device; and
   if the device address carried by each alarm of the at least one alarm is the same as the address of the affected edge device, determining that the alarm is an alarm from the affected edge device.

10. The method according to claim 6, further comprising:
    creating a corresponding relation among the identifier of the failed link, the root alarm and the derivative alarm.

11. A failed link locating device, comprising:
    a processor; a non-transitory computer readable medium connected to the processor and having stored thereon instructions for causing the processor to: obtain an alarm raising time;

compare a pre-failure link state database and a post-failure link state database that are corresponding to the alarm raising time to determine a failed link;
to determine, in an entire-network path vector matrix, an affected edge device corresponding to the failed link and a device interface of the affected edge device;
to send an identifier of the failed link, an identifier of the affected edge device, and an identifier of the device interface of the affected edge device to a device for alarm root cause analysis;
compare a state of each link in the pre-failure link state database corresponding to the alarm raising time and a state of each link in the post-failure link state database corresponding to the alarm raising time, and determine a link in invalid state as the failed link.

12. The failed link locating device according to claim 11, wherein the non-transitory computer readable medium further has stored thereon instructions for causing the processor to: listen to an link state database update message sent by a network control plane;
store the pre-failure link state database and the post-failure link state database, wherein a start time of storing the post-failure link state database corresponds to the alarm raising time; and
compare the pre-failure link state database corresponding to the alarm raising time stored by the storage module and the post-failure link state database corresponding to the alarm raising time stored by the storage module to determine the failed link.

13. The failed link locating device according to claim 11 wherein the non-transitory computer readable medium further has stored thereon instruction for causing the processor to calculate an entire-network path vector matrix by using a shortest path first algorithm; and
determine, in the entire-network path vector matrix calculated by the calculating module, the affected edge device corresponding to the failed link and device interface of the affected edge device.

14. The failed link locating device according to claim 11, wherein the non-transitory computer readable medium further has stored thereon instructions for causing the processor to: the determining module is configured to determine, in the entire-network path vector matrix, a path comprising the failed link, wherein an edge device on the path is the affected edge device and an interface, which is in connection with the path, of the affected edge device is the device interface.

15. The failed link locating device according to claim 11, wherein the identifier of the failed link comprises a plurality of addresses of devices at two ends of the failed link and a plurality of device interfaces of the devices at the two ends of the failed link.

16. An alarm root cause analyzing device, comprising:
a processor; a non-transitory computer readable medium connected to the processor and having stored thereon instructions for causing the processor: obtain at least one alarm of managed network;
send an alarm raising time to a failed link locating device;
receive an identifier of a failed link, an identifier of an affected edge device, and an identifier of a device interface of the affected edge device that are sent by the failed link locating device, wherein the identifier of the failed link, the identifier of the affected edge device, and the identifier of the device interface of the affected edge device are located, according to the alarm raising time, by the failed link locating device;
query whether any alarm from the failed link exists in the at least one alarm and whether any alarm from the affected edge device exists in the at least one alarm;
mark, in response to an alarm from the failed link existing in the at least one alarm, the alarm from the failed link as a root cause alarm; and
judge, in response to an alarm from the affected edge device exists existing in the at least one alarm, whether a service object corresponding to the alarm from the affected edge device is borne over the device interface of the affected edge device; further wherein when the mark, in response to an alarm from the affected edge device existing in the at least one alarm and a judging result of the instruction causing the processor to judge is yes, the alarm from the affected edge device as a derivate alarm.

17. The alarm root cause analyzing device according to claim 16, wherein the identifier of the failed link comprises a plurality of addresses of devices at two ends of the failed link and a plurality of device interfaces of the devices at the two ends of the failed link.

18. The alarm root cause analyzing device according to claim 17,
wherein the non-transitory computer readable medium further has stored thereon instruction for causing the processor to: query whether a device address carried by each alarm of the at least one alarm is the same as the address of a device at either end of the failed link, if the device address carried by each alarm of the at least one alarm is the same as the address of a device at either end of the failed link, query whether a service object corresponding to the alarm is borne over the failed link, and if yes, determine that the alarm is an alarm from the failed link.

19. The alarm root cause analyzing device according to claim 16, wherein the non-transitory computer readable medium further has stored thereon instructions for causing the processor to: query whether a device address carried by each alarm of the at least one alarm is the same as the device address of the affected edge device and if the device address carried by each alarm of the at least one alarm is the same as the device address of the affected edge device, determine that the alarm is an alarm from the affected edge device.

20. The alarm root cause analyzing device according to claim 16, wherein the non-transitory computer readable medium further has stored thereon instructions for causing the processor to: create a corresponding relation among the identifier of the failed link, the root alarm and the derivative alarm.

21. An alarm root cause analyzing system, comprising:
a failed link locating device and an alarm root cause analyzing device, wherein:
the failed link locating device is configured to receive an alarm raising time sent by the alarm root cause analyzing device; compare a pre-failure link state database and a post-failure link state database that are corresponding to the alarm raising time to determine a failed link; determine, in an entire-network path vector matrix, an affected edge device corresponding to the failed link and a device interface of the affected edge device; and send an identifier of the failed link, an identifier of the affected edge device, and an identifier of the device interface of the affected edge device to the alarm root cause analyzing device; and the alarm root cause analyzing device is configured to obtain at least one alarm of a managed network; send the alarm raising time to the failed link locating device; receive the identifier of the failed link, the identifier of the affected edge device, and the identifier of the device interface of the affected edge device that are sent by the failed link locating device, wherein the identifier of the failed link, the identifier of the affected edge device, and the identifier of the device interface of the affected edge device are located, according to the alarm raising time, by the failed link locating device; query whether any alarm from the failed link exists in the at least one alarm, and if an alarm from the failed link exists in the at least one alarm, mark the alarm from the failed link as a root cause alarm; and query whether any alarm from the affected edge device exists in the at least one alarm, and if an alarm from the affected edge device exists, further judge whether a service object corresponding to the alarm from the affected edge device is borne over the device interface of the affected edge device, and if yes, mark the alarm from the affected edge device as a derivative alarm.

22. The system according to claim 21, wherein:
the alarm root cause analyzing device is further configured to create a corresponding relation among the identifier of the failed link, the root alarm and the derivative alarm.

* * * * *

UNITED STATES PATENT AND TRADEMARK OFFICE
CERTIFICATE OF CORRECTION

| | | |
|---|---|---|
| PATENT NO. | : 9,014,009 B2 | Page 1 of 1 |
| APPLICATION NO. | : 13/338468 | |
| DATED | : April 21, 2015 | |
| INVENTOR(S) | : Guoping Li et al. | |

It is certified that error appears in the above-identified patent and that said Letters Patent is hereby corrected as shown below:

In the claims,

In Col. 15, lines 59 - 60, claim 16, delete "instructions for causing the processor: obtain at least one alarm of managed network;" and insert --instructions for causing the processor to:
obtain at least one alarm of managed network;--

Signed and Sealed this
Twenty-fifth Day of August, 2015

Michelle K. Lee
*Director of the United States Patent and Trademark Office*